United States Patent Office
3,225,516
Patented Dec. 28, 1965

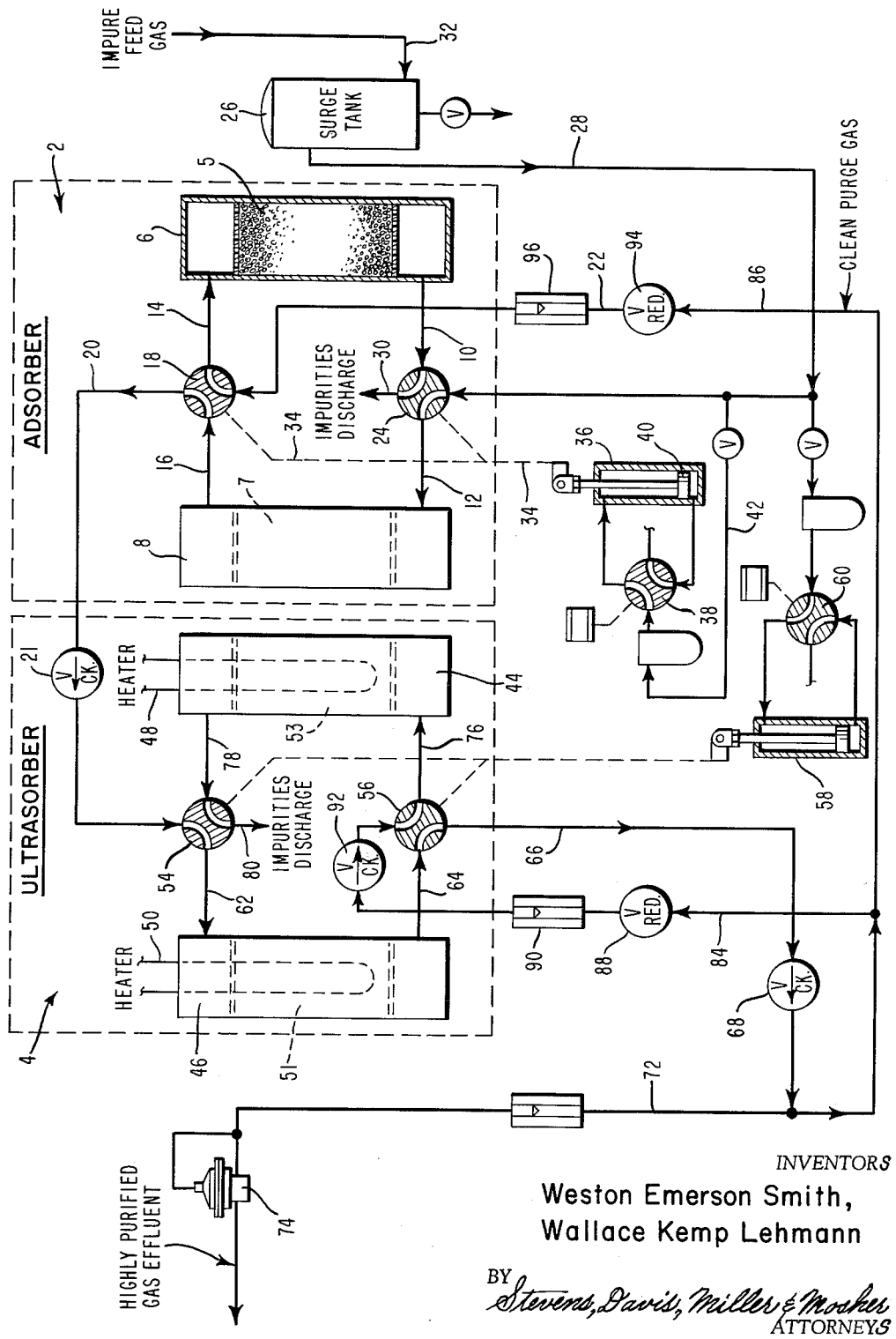

3,225,516
METHOD AND APPARATUS FOR PURIFYING GASEOUS MIXTURES BY CYCLIC ADSORPTION
Weston Emerson Smith, Pikesville, and Wallace Kemp Lehmann, Hampton, Md., assignors to The C. M. Kemp Mfg. Co., Glen Burnie, Md., a corporation of Maryland
Filed Apr. 15, 1963, Ser. No. 273,150
12 Claims. (Cl. 55—25)

This invention relates to a process and apparatus for continuously removing contaminants from a gas stream formed of the products of combustion of a hydrocarbon fuel by multiple cyclic adsorption in which a portion of the highly purified effluent produced by the removal of the contaminants from the gas stream serves as purge gas for the desorption of the contaminants.

Protective gas atmospheres, essentially free of reactive contaminants, are often needed by many industries. Such inert gaseous atmospheres are usually nitrogen-rich gas streams containing small amounts of combustibles, e.g. carbon monoxide and hydrogen; and ideally are substantially pure nitrogen. In order to produce these nitrogen-rich atmospheres, many methods and various combinations of apparatus have been employed. Generally these methods and apparatus are costly to operate and may remove the contaminants only by employing large amounts of adsorbent material in a plurality of separation zones operating with multiple stages of cyclic adsorption, cooling, preheating and regeneration. Thus, less pure gaseous atmospheres may be employed due to the unavailability or cost of a truly nonreactive atmosphere.

Advantageously, in accordance with this invention a highly purified, protective atmosphere can be produced economically from an impure nitrogen gas stream with a relatively small amount of adsorbent material by cyclic dual adsorption in which two gas adsorption units, each operating with cycles of adsorption and desorption, are interconnected so that the entire partially purified effluent of one unit passes to the other unit for further purification and a portion of the highly purified nitrogen produced by the other unit is used to purge the impurities from both units during the desorption cycles.

This invention contemplates a process for separation of undesired impurities from a gas stream containing nitrogen as a major component which comprises partially removing the larger proportion of impurities from a nitrogen-rich gas produced from the combustion of a hydrocarbon fuel in air in a first adsorption zone, substantially removing the remaining minor proportion of impurities in a second adsorption zone, continuously recovering a highly purified effluent gas from the second zone, and purging the adsorbed impurities from both of the adsorption zones with a portion of the highly purified effluent gas.

Furthermore, this invention is directed to an apparatus for separation of contaminants from an impure gas stream by cyclic dual adsorption in which an adsorber unit and a heated ultrasorber unit are interconnected by conduit means that are controlled by a programmed timer device. Each unit has two adsorber vessels that are alternately on cycles of adsorption and desorption. Conduit means convey an effluent gas partially free of contaminants produced by the adsorber unit to the ultrasorber unit for further adsorption. At the same time, other conduit means divert a portion of an effluent gas essentially free of contaminants from the product line of the ultrasorber to serve as purified purge gas for the vessels of both units which are on the desorption cycle.

In addition, this invention further contemplates the use of adsorbent molecular sieves having certain defined pore sizes and a particular particle size for removing impurities such as carbon dioxide, water vapor and the like products of combustion from a nitrogen-rich gas stream by the heretofore described cyclic dual adsorption process.

The invention will be described by reference to the accompanying drawings which are a schematic showing of a dual adsorption apparatus illustrating the adsorber vessels, conduits, valves and controls adapted to perform the contemplated process.

As shown in the drawings the reference numerals 2 and 4 designate an adsorber unit and an ultrasorber unit, the adsorber unit being operated to partially remove contaminants from an impure gas and the ultrasorber unit being connected to receive and further purify the partially purified gas from the adsorber unit. Each of these units have two parallel arranged adsorber vessels having conduits and four-way valve connections so as to be shifted through alternate stages of cyclic adsorption and desorption.

In the adsorber unit, the adsorber vessels 6 and 8 are adapted to contain solid adsorbent materials in a packed stationary bed. The nature and particle size of these materials will be later described in greater detail, but as shown in adsorber 6 and 8, the adsorbent materials will be designated as 5 and 7, respectively. The adsorber vessels 6 and 8 are provided with internal adsorbent support baffles or plates, gas flow directing baffles, and high pressure relief valves, as well as pressure and temperature indicating gauges conventionally employed with solid adsorbent devices.

Each of the adsorber vessels has conduits for introducing purge gas and impure feed gas into the adsorbent material and for discharging partially purified effluent and contaminant laden purge gas from the adsorbent bed. Combined feed inlet and purge outlet conduits 10 and 12, as well as combined partially purified effluent outlet and purge inlet conduits 14 and 16 are provided for adsorber vessels 6 and 8, respectively.

Each of these combined conduits are connected to a four-way valve which is controlled to change the fluid to be handled by the conduit. The four-way valve 18 is in fluid communication with the effluent discharge line 20 and a purge gas line 22, while four-way valve 24 is in communication with the surge tank 26 via impure feed gas line 28 and an impurities discharge conduit 30. An inlet line 32 introduces the impure feed gas into the surge tank which operates to prevent excessive swings in pressure on cycling of the adsorber and ultrasorber units.

Thus, as shown in the drawing, four-way valve 24 directs impure feed gas into the bottom of adsorber 6 and discharges impurities and purge gas from the bottom of adsorber 8 and four-way valve 18 directs clean purge gas into the top of adsorber 6 and conveys partially purified effluent gas from adsorber 8 to line 20.

Four-way valves 18 and 24 are automatically controlled by a common actuated linkage 34 that is shifted by a means of a pneumatic air cylinder 36 operated by a four-way solenoid valve 38. A movable piston 40 is positioned within the air cylinder so as to be moved from one end of the cylinder to the other by gas pressure taken from the impure feed gas line. A portion of the impure gas stream effects movement of the piston by being directed through conduit 42 and four-way solenoid valve 38 to one side of the piston. The solenoid valve is controlled by a program timer (not shown) which has been programmed to shift the four-way valves 18 and 24 so that the adsorber vessels 6 and 8 alternately operate through cycles of adsorption and desorption.

The four-way valves of the adsorber unit are actuated by the program timer over relatively short periods of time so that the adsorber unit has cycles of adsorption and desorption in each adsorber vessel which extend from about 30 seconds to about 5 minutes. The operation of the adsorber is thereby conducted so that the adsorption of the impurities on the adsorbent bed is maintained at a high rate to effect removal of a large quantity of impurities during the adsorption cycle.

The adsorber vessels 44 and 46 of the ultrasorber 4 are constructed and arranged similar to those of the adsorber unit 2 except that each is provided with heating devices 48 and 50 for supplying heat to the beds of adsorbent material 51 and 53 during the desorption cycles. The heating device may be an indirect heat exchanger employing steam or the like fluid, but as shown in the present embodiment it preferably is an electrical heater made of resistance elements. The electrical heaters are activated by the program timer, in a manner to be further described in more detail, to reactivate the bed of adsorbent material being desorbed.

In the ultrasorber unit interlinked four-way valves 54 and 56, actuated by air cylinder 58 and four-way solenoid valve 60, direct the partially purified gas from the effluent discharge line 20 of the adsorber unit into the adsorber vessel 46 via combined inlet and purge outlet conduit 62, and simultaneously discharge the highly purified effluent from the adsorber vessel 46 via combined purge inlet and effluent discharge conduit 64, line 66, check valve 68 to a product line 72. This line leads to a point of intended use or to a storage means. A back pressure regulator valve 74 in the product line operates to maintain the pressure in the adsorber vessel 46 of the ultrasorber unit at the desired level for efficient adsorption. At the same time the purified effluent is being discharged the four-way valves 54 and 56 introduce purge gas via conduit 76 into adsorber vessel 44 and receive via conduit 78 purged impurities which are directed to discharge line 80.

The four-way valves of the ultrasorber unit are actuated after extended periods of operation so that the cycles of adsorption and desorption in the adsorber vessels may extend from about 1 to 8 hours. Because of this extended operation, the electric heaters are necessary to supply heat for desorption. It will be appreciated that such operation allows the ultrasorber unit sufficient time to remove substantially all of the impurity gases mixed with the inert nitrogen stream particularly where the concention of impurities in the partially purified effluent is relatively high.

Product line 72 connects to manifold 82 which distributes a portion of the highly purified effluent gas to purge lines 84 and 86 of the ultrasorber and adsorber units, respectively. Purge line 84 has a pressure reducing valve 88 which effects a substantial reduction in pressure of the purified gas effluent, i.e., a reduction ratio of about 5 to 1 before the gas passes via flow rate indicator 90 to check valve 92 and into four-way valve 56. In a like manner, purge gas passes into adsorber vessel 6 via purge line 86, pressure reduction valve 94, and flow indicator device 96, to four-way valve 24.

It will be appreciated that the program timer used to actuate the four-way valves of the adsorber unit is integrated to also actuate the four-way valves of the ultrasorber unit so that overall operation of the adsorber and ultrasorber is controlled as a cyclic dual adsorption process to produce a continuous flow of highly purified effluent gas. Thus, the electric heaters of the ultrasorber are actuated simultaneously with the four-way valves 54 and 56 so that desorption of one adsorber vessel will be effected by the addition of heat. In addition, it will be appreciated that the operating cycles of each unit operate independently of each other. The adsorber unit operates with short cycles of adsorption and desorption in each adsorber vessel, whereas the adsorber vessels of the ultrasorber have extended periods of cyclic adsorption and desorption. Furthermore, the cycles of adsorption and desorption in the adsorber unit and/or ultrasorber unit may be varied over selective ranges to effect modification in the cyclic dual adsorption process for different compositions of impure feed gases to be treated.

Referring now to the adsorbent materials to be utilized within the adsorber vessels of this invention, that have been designated by the reference numerals 5, 7, 51 and 53, these materials may be selected from a variety of solid adsorbents that have adsorptive characteristics suitable for removing one or more of the contaminants found in the impure gas feed introduced by inlet line 32. The adsorbent employed may be activated carbon, silica gel, activated alumina, glass wool, and certain metal oxides. In addition, clay, Fuller's earth, diatomaceous earth, bone char, microtraps, as well as a siliceous material known as Mobilebeads may be utilized. Of the above mentioned adsorbents, silica gel, activated alumina, microtraps and Mobilebeads are preferably selected.

Another class of solid adsorbents, that is preferred for use in the adsorber vessels of this invention, is generally referred to as molecular sieves. These materials are naturally occurring and synthetic zeolites which contain a large number of small cavities interconnected with pores of uniform size. These zeolites usually have a defined pore size of from about 4 A. to 15 A. in diameter within a crystalline structure and have a composition of aluminum, aluminum oxide, silica, oxygen and either an alkali metal or an alkaline earth metal, i.e., sodium, calcium and potassium. Among the naturally occurring zeolites may be mentioned chabazite, analcite, faujasite and heulandite. Representative of the synthetic zeolites are those commercially designated as zeolite A, zeolite X, zeolite Y, and the like.

One particularly effective zeolite suitable for the purpose of this invention is designated as a 4A molecular sieve and has a crystalline porous structure with a uniform pore size of about 4 A. in diameter. The zeolite material is especially effective for removing carbon dioxide and other such impurities from a nitrogen-rich gas produced by partial or complete combustion of a hydrocarbon fuel. Among the other suitable zeolites, one designated as 5A molecular sieve having a uniform pore size of about 5 A., is also an effective adsorbent for the present invention. It will be appreciated that in general all of the zeolites described above having a pore size of from 4 A. to 13 A. in diameter will remove water vapor from a gaseous stream. Accordingly, the nitrogen-rich gas produced by the process of this invention not only will be free from the organic products of combustion but also will be dry.

In accordance with this invention, it has been found that certain molecular sieve materials are more suitable for the short cycle operation of the adsorber unit. Apparently, the rate of diffusion of the adsorber gas into the adsorbent particle is more significant during the short operating cycles. The particle size of a molecular sieve material thus has an important effect on its adsorptive capacity at the high adsorption rates of the adsorber unit. The molecular sieves which have been found to be especially suitable for the short cycles of the adsorber unit are the 4A molecular sieves having particle sizes of from about $\frac{1}{32}''$ to $\frac{3}{16}''$ in diameter, the smaller size particles being preferred. The smaller size particles are substantially more effective adsorbents at the higher rates of flow often demanded for the adsorber unit; the difference in adsorption capacity being greater with increasing flow rates. For example, at a flow rate of 40 s.c.f.m. under equivalent operating conditions, a $\frac{1}{16}''$ particle of the 4A molecular sieves will produce a partially purified nitrogen effluent containing about one-tenth the volume of carbon dioxide produced by particles having a size of from 4 to 8 mesh.

Advantageously, many gaseous contaminants may be removed from an impure gas stream by the process of this invention, particularly the products of combustion of a hydrocarbon fuel burned in air. These gaseous contaminants include carbon dioxide, acetylene, hydrogen sulfide, sulfur dioxide, oxides of nitrogen, and the like combustion products. Because the process of this invention is concerned with the production of a protective atmosphere of an inert gas having non-reactive properties, the contaminants generally removed are carbon dioxide and water vapor, and the resulting purified effluent is preferably nitrogen. In addition, depending on the source of the impure gas stream, the process may be conducted so that the purified effluent will additionally contain combustibles, particularly carbon monoxide and hydrogen, or these gases may also be removed. It will be appreciated that certain rare gases, e.g. argon and krypton which were present in the original atmosphere used to effect combustion, will also be present within the purified gaseous effluent.

To illustrate the process of this invention, a stream of nitrogen-rich gas containing from about 5 to 20 percent by weight of carbon dioxide and saturated with water vapor at a temperature from about 50° to 100° F. enters the surge tank 26, as shown in the drawing, at a high pressure. Generally, the gas pressure is from about 40 p.s.i.g. to about 150 p.s.i.g., and preferably above about 60 p.s.i.g. The impure feed gas then passes via feed line 28 and four-way valve 24 of the adsorber unit into the adsorber vessel 6 which is on an adsorption cycle. The bed of adsorbent material preferably is the 4A molecular sieve material having a particle size of $\frac{1}{16}''$ in diameter. It will be appreciated that after being in operation for a short period, the pressure and temperature of the adsorber vessel will be essentially that of the entering impure feed gas stream.

The adsorber unit operates on short cycles which may range from about 30 seconds to 5 minutes per adsorber vessel, i.e. a reversal from adsorption to desorption occurring at the end of each cycle. By operating in this manner it will be appreciated that the maximum rates of adsorption for the solid adsorbents are utilized so that relatively large amounts of carbon dioxide, water vapor, and other impurities may be removed at the pressures and temperatures of the entering impure feed stream. Also, because of the short cycles of operation, some of the heat of adsorption produced during the adsorption cycle will be returned within the adsorbent bed so as to provide a portion of the heat necessary to effect desorption of the bed on the subsequent desorption cycle. In general, the partially purified effluent from the adsorber vessel 8 contains from about 0.01 percent by weight to about 0.5 percent by weight of carbon dioxide with the water vapor reduced to below minus 90° F. dewpoint, together with traces of other impurities.

As shown by the positions of four-way valves 18 and 24 and the locations of conduits 10 and 14 associated with adsorber vessel 6 when the adsorber vessel is on a desorption cycle purified effluent from the altrasorber unit serves to purge the adsorbent material 5 countercurrent to the direction of flow during the adsorption cycle. In addition, the highly purified purge gas, being essentially free of impurities, has a high capacity for removing impurities from the adsorbent material. Apparently, the high purity of the gas produces a large vapor pressure differential between the adsorbent bed and the gas so that the adsorbed impurities are readily desorbed.

Furthermore, the purified purge gas also serves to supply the additional heat required to effect substantially complete desorption of the impurities from the adsorbent material. Thus, a portion of the heat of adsorption produced in the ultrasorber unit is conserved by the highly purified purge gas and additional heat is not required to effect desorption of the short cycle adsorber vessels.

After passage through the four-way valve 18, the partially purified nitrogen effluent then enters the adsorber vessel 46 of the ultrasorber unit via line 20, check valve 21, four-way valve 54 and conduit 62.

In this adsorber the remaining carbon dioxide and other impurities are separated from the effluent gas by another bed of 4 A. zeolite. The final high purity gas, which is discharged from the ultrasorber unit via conduit 64 and four-way valve 56, is essentially pure nitrogen containing small amounts of the rare gases originally present in the air charge used to form the impure gas stream.

Because the ultrasorber unit operates on long cycles from about 1 hour to about 5 hours in length, it will effectively remove the small amounts of carbon dioxide and other impurities from the partially purified effluent. However, at these extended cycles, there is the loss of heat from the adsorbent bed which must be supplied during the desorption cycle by the electrical heaters 48 and 50.

A portion of the highly purified nitrogen (from about one-fourth to about one-half of the effluent discharged from the ultrasorber) is diverted through manifold 82 to serve as purge gases for the adsorber vessels 46 and 48 of the adsorber and the ultrasorber, respectively.

From the manifold, a major portion of the highly purified nitrogen passes through reduction valve 94 which effects substantially adiabatic expansion of the gas so that its pressure is substantially lowered, i.e., from the pressure of the ultrasorber to about atmospheric. This expanded gas is then introduced via conduit 14 to adsorber vessel 6 of the adsorber unit which is on the desorption cycle. This adsorber has been previously depressurized by the four-way valve 24 so that the purge gas then passes countercurrent to the flow of gas during the adsorption cycle to complete the desorption of the carbon dioxide and other impurities. Also, the other adsorber vessel 48 of the ultrasorber is purged with the remaining portion of nitrogen in the manifold via pressure reduction valve 58, conduit 76, and four-way valve 56.

It will be appreciated that the process of this invention may be modified by changing the temperatures, pressures, type of adsorbents employed and flow rates of the gases to be treated. The manner in which these and other conditions effect the process may be more readily understood from the following example:

The following example is a run based on a product requirement of 2,400 s.c.f.h. of a nitrogen gas essentially free of $CO_2$ and was conducted in a cyclic dual adsorption apparatus as illustrated in the drawings.

The adsorber vessels of the adsorber unit had a volume of 6.4 cubic feet and contained 290 lbs. of the 4A molecular sieve $\frac{1}{16}''$ pellets. The adsorber unit operated with reversal of adsorption and desorption cycles every two minutes. The ultrasorber unit operated on adsorption cycles of four hours and its adsorber vessels contained 261 lbs. of the 4A molecular sieve material having a 4/8 mesh size.

6,150 s.c.f.h. of a nitrogen-rich stream containing 11.7 volume percent of $CO_2$ was introduced into the surge tank of the cyclic dual adsorption system at a temperature of 78° F. and a pressure of 86 p.s.i.g. From the surge tank, the gas was directed into the adsorber unit where it was treated to cyclic adsorption alternately in the two adsorber vessels operating at temperatures of 71° and 73° F., respectively. The purge rate during desorption cycles for the adsorber unit was 19.2 s.c.f.m. A partially purified gas was passed from the adsorber unit with a $CO_2$ content of from 200–730 p.p.m.

In the ultrasorber unit the $CO_2$ content of the nitrogen gas stream was further reduced by cyclic adsorption between two adsorber vessels operating at temperatures of 82° and 86° F., respectively. These vessels were desorbed from temperatures of 250° to 500° F. at a purge rate of 4 s.c.f.m. The highly purified effluent contained less than 20 p.p.m. of $CO_2$ and was produced at a rate of 45.8 s.c.f.m.

As shown by the above data, the process and apparatus of this invention produces a highly purified effluent gas in a continuous manner. The greatly reduced content of $CO_2$ found within the effluent clearly indicates that the present invention provides a highly efficient large scale type of operation for supplying protective gas atmospheres to industrial installations. Also, it will be seen that since the amount of purified gas employed as purge gas for desorption purposes is about one-third of that produced by the ultrasorber, large volumes of a protective atmosphere may be produced by the present invention.

It will be appreciated that the gaseous contaminants designated in the specification and illustrated by the example are merely illustrative of the various contaminating materials which may be removed from a gaseous stream by the process of the present invention and that additional contaminants other than products of combustion of hydrocarbon fuel may be removed in accordance with this invention.

It will also be appreciated that although molecular sieve materials are used in the example, other solid adsorbents may be effectively employed in the process and apparatus of this invention.

It will be additionally appreciated that the cyclic operation of the adsorber unit and the ultrasorber unit may be independently varied with respect to each other so that greater or lesser amounts of gaseous contaminants may be removed in either the adsorber or the ultrasorber unit. It will further be appreciated that the process and apparatus of this invention, as described and illustrated, may be subject to various modifications and alterations without departing from the spirit of the invention.

What is claimed is:

1. A process for continuous non-selective separation of impurities from a gas stream containing combustion products of a hydrocarbon fuel which comprises alternately adsorbing the greater proportion of the impurities from a gas stream in one of two first adsorbent beds arranged for alternately shifting between cycles of high pressure adsorption and low pressure desorption and controlled so as to operate for short periods of cyclic adsorption and desorption, continuously recovering a partially purified effluent from one of said adsorbent beds, alternately adsorbing substantially all of the remaining impurities from said partially purified gas in another one of two second adsorbent beds arranged for alternately shifting between cycles of high pressure adsorption and low pressure desorption and controlled so as to operate for extended periods of cyclic adsorption and desorption, continuously recovering a substantially purified gas from one of said second adsorbent beds; at the same time, diverting a portion of the recovered purified effluent gas to a distribution zone, passing the major portion of the purified effluent from the distribution zone through a pressure reducing zone to expand the purified effluent, purging the impurities from the other of said first adsorbent beds with said expanded purified effluent, passing the remaining portion of gas in said distribution zone to another pressure reducing zone, and purging the impurities from the other of said second adsorbent beds with said remaining portion of said purified effluent while supplying heat to said second adsorbent bed during the desorption cycle.

2. An adsorption apparatus for removing impurities from a gas stream which comprises an adsorber unit and an ultrasorber unit having heating means therein, each unit comprising two adsorber vessels that alternately operate through cycles of adsorption and desorption; adsorbent material in each adsorber vessel for selectively adsorbing the impurities from the gas stream to be treated; inlet conduit means connected to each of the adsorber vessels of the adsorber unit for supplying a gas stream to be treated, valve means in said inlet conduit means for alternately shifting the flow of the gas stream from vessel to vessel; effluent outlet conduit means connected to each adsorber vessel of the adsorber unit for removing a partially purified effluent gas therefrom, valve means in said outlet conduit means for alternately shifting the flow of partially purified effluent gas from vessel to vessel; effluent inlet means connected to each adsorber vessel of the ultrasorber unit for supplying the partially purified effluent produced in the adsorber unit, valve means in said effluent conduit means for alternately shifting flow of effluent from vessel to vessel; purified effluent conduit means connected to each adsorber vessel of the ultrasorber unit for removing a substantially purified effluent, valve means in said purified effluent conduit means for alternately shifting the flow of substantially purified effluent from vessel to vessel; purge inlet conduit means connected to each adsorber vessel of the adsorber unit and the ultrasorber unit for introducing purge gas into the adsorbent material, valve means in said purge conduit means for alternately shifting the flow of purge gas from vessel to vessel in each unit; discharge conduit means connected to each adsorber vessel of the adsorber unit and the ultrasorber unit for removing impurities from the adsorbent material to the atmosphere, valve means in said discharge conduit means alternately shifting the discharge of impurities from vessel to vessel in each unit; distribution conduit means connected to said purified effluent conduit means for separating a portion of said purified gas from the product stream, purge gas conduit means connected to said distribution conduit means and to said purge inlet conduit means of the adsorber vessels, pressure reducing means in each of said purge gas conduit means for expanding the purified gas which serves as purge gas, control means connected to said valve means in said effluent outlet conduit means so that the partially purified effluent produced in said adsorber unit is conducted to said ultrasorber unit for further adsorption and a portion of the purified effluent from the ultrasorber unit serves as purge gas for desorption of the adsorber vessels of the heated ultrasorber unit and the adsorber unit which are on the desorption cycle, means controlled to operate the adsorber unit for short periods of cyclic adsorption and desorption, means controlled to operate the ultrasorber unit for extended periods of cyclic adsorption and desorption and means for passing a major portion of the purge gas to the adsorber vessels of the adsorber unit.

3. The process of claim 1 in which the impurities comprise carbon dioxide, water vapor, acetylene, sulfur dioxide, hydrogen sulfide and the gas stream is nitrogen.

4. The process of claim 1 in which the cycles of adsorption and desorption in said first two adsorbent beds extend from about 30 seconds to about 5 minutes.

5. The process of claim 1 in which the cycles of adsorption and desorption in the second two adsorbent beds extend from about 1 hour to about 8 hours.

6. The process of claim 1 in which said gas stream has a pressure of from about 40 p.s.i.g. to about 150 p.s.i.g.

7. The process of claim 1 in which the adsorbent material in the adsorbent beds is selected from the class consisting of silica gel, activated alumina, microtraps, Mobilebeads, and molecular sieve materials.

8. The process of claim 1 in which the adsorbent material in the adsorbent beds is 4A molecular sieves.

9. The process of claim 1 in which the adsorbent material in the first adsorbent beds is a 4A molecular sieve material having a particle size $\frac{1}{16}''$ and the adsorbent material in the second adsorbent beds is a 4A molecular sieve material having a particle size of from 4 to 8 mesh.

10. The process of claim 1 in which the purified effluent used to purge the impurities during the desorption cycle passes countercurrent to the flow of the gas stream being adsorbed in the adsorbent bed during the adsorption cycle.

11. The apparatus of claim 2 in which said latter means operates to pass the purge gas during the desorption cycle countercurrent to the flow of gas being adsorbed on the adsorbent material during the adsorption cycle in each adsorber vessel.

12. A process for continuously removing gaseous contaminants from a gas stream by cyclic adsorption which comprises alternately adsorbing a major proportion of the gaseous contaminants contained within a gas stream in one of two first adsorbent materials arranged and controlled for alternately shifting between short cycles of high pressure adsorption and low pressure desorption, recovering a partially purified effluent gas from said adsorbent material, alternately adsorbing substantially all of the remaining contaminants from said partially purified gas in another one of two second adsorbent materials arranged and controlled for alternately shifting between extended cycles of high pressure adsorption and low pressure desorption, recovering a substantially purified gas from one of said second adsorbent materials; at the same time, purging the impurities from the other of said first adsorbent materials with a portion of the substantially purified gas and purging the impurities from the other of said second adsorbent materials with a lesser portion of the substantially purified gas while supplying heat to the other of said second adsorbent materials during the desorption cycle.

References Cited by the Examiner

UNITED STATES PATENTS

| | | | |
|---|---|---|---|
| 2,712,981 | 7/1955 | Beggs | 55—62 X |
| 2,882,243 | 4/1959 | Milton | 55—75 X |
| 2,944,627 | 7/1960 | Skarstrom | 55—62 X |
| 3,102,013 | 8/1963 | Skarstrom | 55—62 X |
| 3,103,425 | 9/1963 | Meyer | 55—62 |

OTHER REFERENCES

Hersh, C. K.: Molecular Sieves. Rheinhold, N.Y., 1961, pp. 54, 76, 79.

REUBEN FRIEDMAN, *Primary Examiner.*